United States Patent Office 3,654,328
Patented Apr. 4, 1972

3,654,328
POLYMERIC METAL DIALKARYLDITHIO-PHOSPHATES
Thomas V. Liston, San Rafael, Calif., assignor to Chevron Research Company, San Francisco, Calif.
No Drawing. Filed Mar. 19, 1970, Ser. No. 21,209
Int. Cl. C07f 3/06
U.S. Cl. 260—429.9                  5 Claims

ABSTRACT OF THE DISCLOSURE

Polymeric metal dialkaryldithiophosphates are produced by the reaction of an alkylene-di-p-phenol, phosphorus pentasulfide, and a Group II metal compound. Calcium, barium, and especially zinc are the preferred Group II metal. These polymeric materials show excellent thermal stability in the thermogravimetric test.

BACKGROUND OF THE INVENTION

Field of the invention

This invention relates to novel dialkaryldithiophosphates. More particularly, the invention concerns new polymeric metal dialkaryldithiophosphates having improved thermal stability.

Dialkaryldithiophosphates are useful for a variety of purposes known to the art. Monomeric metallic dialkaryldithiophosphates in particular are employed as oxidation and corrosion inhibitors and anti-wear extreme pressure additives in petroleum hydrocrabon compounds, such as lubricating oils, fuels, greases, and asphalts.

In lubricating compositions, high temperature performance has become more and more critical. Modern, more efficient engines are designed to operate at increasingly higher temperatures and under more severe conditions, and the lubricating oils and greases must withstand these high temperatures with as little deterioration as possible.

DESCRIPTION OF THE PRIOR ART

U.S. Pat. Re. 22,829 discloses the reaction of a phenol with phosphorus pentasulfide followed by reaction with a metal, to form a metallic dialkaryldithiophosphate. The product monomer is disclosed to be useful as a lube oil antioxidant. Much other prior art discloses various forms of monomeric metallic dialkaryldithiophosphates, including U.S. Pats. 2,689,220 and 2,945,810, and their combination in physical mixtures with other additives.

SUMMARY

The composition of this invention is a polymeric metal dialkaryldithiophosphate containing at least two monomer units and produced by first reacting a bisphenol, or alkylene-di-p-phenol, with phosphorus pentasulfide and then reacting the resultant polymeric dithiophosphoric acid with a metal compound.

DETAILED DESCRIPTION OF THE INVENTION

In its broadest form, this invention is a polymeric metal dialkaryldithiophosphate composition produced by first polymerizing a bisphenol, or alkylene-di-p-phenol, with phosphorus pentasulfide, followed by reaction of the resulting polymeric dithiophosphate with a Group II metal. The product polymer contains at least two monomer units.

The polymeric compositions of this invention are predominately of the following recurring monomeric unit:

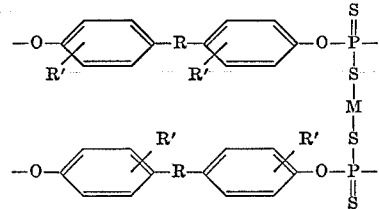

wherein R is a bivalent alkylene radical of from 1–50 carbon atoms, and preferably 5–30 carbon atoms; R' is an alkyl radical of 1–15 carbon atoms, with the provision that when R is $C_1$–$C_3$ alkylene, R' will be at least $C_6$ to impart oil solubility to the molecule; and M is a Group II metal. The R' radical may be attached at any position ortho- or meta- to R.

These polymeric compositions include among their properties the ability to withstand degradation, measured by weight loss, at temperatures of about 800° F. This thermal stability is obtained without any adverse effect on the antioxidant and extreme pressure properties of the composition when used as an additive in lubricants.

The bisphenols, or alkylene-di-p-phenols, used to produce the polymers of this invention, have the formula:

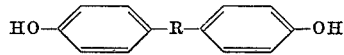

wherein R is as defined above. Representative bisphenols include bis(4'-hydroxy-3-hexylphenyl)methane, 1,2-di(4'-hydroxy - 2 - octylphenyl)ethane, 1,3 - di(4'-hydroxy-3-dodecylphenyl)propane, 1,10 - di(4' - hydroxyphenyl) decane, 1,20-di(4'-hydroxyphenyl)eicosane, 10-methyl-10, 12 - di(4' - hydroxyphenyl)heneicosane, 1,50-di(4'-hydroxyphenyl)pentacontane, 1,35 - di(4' - hydroxyphenyl) pentatriacontane, etc.

The bisphenols may be prepared in a number of ways. These include the reaction of phenols with ketones in the presence of acidic catalysts. Such a reaction is described in U.S. Pat. 2,468,982. In another, and preferred reaction, an alkenyl-p-anisole is dimerized by heating in the presence of a sulfonic acid and then hydrogenated. The hydrogenated dimer is then reacted with hydrogen halide to cleave the ether bondages and produce the desired bisphenol. The structure of the bisphenol will be dependent on the structure of the alkenyl-p-anisole, and particularly on the position of the alkenyl double bond. Definition of the desired polymeric product (i.e., definition of R) will define the possible alkenyl-p-anisole structures which can be used.

The dimerization reaction is conducted in solution. The solvent may be any organic solvent which does not participate in the reaction and which is easily separated from the reaction products. Preferred are the aromatic solvents, such as benzene, toluene, and the xylenes. The sulfonic acid catalyst may be any convenient sulfonic acid, although considerations of cost and availability will usually suggest the use of one of the low molecular weight aromatic sulfonic acids, such as benzene sulfonic acid or p-toluene sulfonic acid. The sulfonic acid must not contain any substituent groups which would substantially reduce the catalytic activity of the sulfonic acid, or would themselves participate adversely in the reaction.

Temperatures of the dimerization reaction are in the range of 100°–300° F., preferably at about 160° F. Pressures are usually atmospheric, but may be in the range of 0.5–2.0 atm. The reaction may be conducted in the presence of air or in an inert atmosphere.

The bisphenol then is reacted with phosphorus pentasulfide in solution and heated to produce a dithiophosphate polymer. The monomeric units of this dithiophosphate polymer are linked through the oxygen bonds remaining when the hydrogen atoms are removed from the hydroxide groups during reaction with the phosphorus pentasulfide.

Reaction conditions for reaction of the bisphenol and the phosphorus pentasulfide include a temperature in the range of 100°–400° F., a pressure in the range of 0.5–2.0 atm., and an inert solvent medium such as toluene or xylene. The reaction is continued for a period of from 1 to 24 hours. At the end of that period, the polymeric dithiophosphate is recovered by filtration and stripping.

The metal-containing polymer is produced by reacting the dithiophosphate polymer with a Group II metal compound. The preferred Group II metals are calcium, barium, or zinc, with zinc being particularly preferred. Several different types of metal compounds may be used, such as the oxide, hydroxide, or carbonate (as, e.g., ZnO, $ZnCO_3$, or $Zn(OH)_2$). The particular compound used will depend in large measure on the ease of separation of the polymeric metal dithiophosphate from the resulting compounds formed by the anion of the metal compound. Reaction is conducted at temperatures in the range of 100°–300° F. and a pressure in the range of 0.5–2.0 atm. An inert solvent such as toluene is used. The metal-containing polymer is recovered by filtration and stripping.

The metal dithiophosphates are used in lubricating oils in amounts sufficient to inhibit oxidation thereof; that is, amounts of 0.25 percent to 20 percent, by weight, preferably from 1.5 percent to 10 percent by weight. Stated in other terms, the amounts of these metal dithiophosphates may be expressed as millimols per kilogram of finished oil, based on the phosphorus content. That is, the amount of metal dithiophosphate is expressed as millimols of phosphorus per kilogram of oil. Expressed in such terms, the amount of metal dithiophosphate used in lubricating oils can be from 1 millimol to 50 millimols of phosphorus per kilogram of finished oil, preferably from 4 millimols to 25 millimols.

Suitable lubricating oils include a wide variety such as naphthenic base, paraffin base, and mixed base mineral oils; synthetic oils, e.g., alkylene polymers, such as polymers of propylene, butylene, etc., and mixtures thereof; alkylene oxide type polymers; dicarboxylic acid esters; liquid esters of phosphorus and silicon; and alkyl aromatic hydrocarbons.

The above base oils may be used individually as such or in various combinations (wherever miscible or whenever made so by the use of mutual solvents).

The following examples will illustrate this invention:

EXAMPLE I p-(1-methyl-1-hydroxy)decylanisole was refluxed for about 16 hours in a toluene solution of p-toluene sulfonic acid. After separation of the water of reaction and removal of the solvent, the product dimer was dissolved in alcohol and hydrogenated overnight with 1350 p.s.i.g. hydrogen at 100°–300° F. in the presence of 5 percent palladium on carbon. The hydrogenated dimer was then dissolved in acetic acid and reacted with hydrogen iodide by stirring at reflux temperature for about 60 hours in a nitrogen atmosphere. The bisphenol product 10-methyl-10,12-di(4'-hydroxy-phenyl)heneiconsane was recovered at greater than 98 percent of theoretical yield.

The bisphenol was dissolved in xylene and, under a nitrogen atmosphere, was heated to 100° C. Phosphorus pentasulfide was added, and the temperature was raised to 135° C. The mixture was stirred for about 16 hours. An 87 percent yield of polymeric O,O'-dialkaryl dithiophosphoric acid was obtained. This material was dissolved in toluene and reacted with zinc carbonate. The final product was filtered and stripped and yielded a polymeric zinc dialkaryldithiophosphate having a number average molecular weight of 4065. With the alkaryl portion of the polymer being derived from the described bisphenol, this number average molecular weight defines a polymer having a number of approximately 3.3 monomer units. This material was labeled "Polymer A."

EXAMPLE II

In a second experiment, a similar reaction produced a polymer ("Polymer B") having a number average molecular weight of 3445, corresponding to a number average of approximately 2.8 monomer units.

Polymers A and B were subjected to the Falex Machine Test to determine EP characteristics. This test is described on pages 27–1 and 27–2 of the Handbook of Lubrication Engineering (O'Connor, ed.: McGraw-Hill Pub. Co., 1968). The additive was dispersed in a base oil consisting of a neutral oil having a viscosity of approximately 480 SUS at 100° F. and a gravity of about 29° A.P.I., and containing 5 percent by weight of a polyisobutenyl succinimide detergent additive and a small amount of terephthalic acid as a copper-lead corrosion inhibitor. In two tests the base oil containing Polymer A had a Falex failure point of 1190 and 1250 pounds, while the oil containing Polymer B had a Falex failure point of 1060 pounds. The base oil containing only 3.5 weight percent of the succinimide failed at 970 pounds.

The high temperature stability of the polymeric zinc dialkaryldithiophosphates of this invention and the superiority over related materials are illustrated in the table below. Polymer B, representing a typical embodiment of the polymeric zinc dialkaryldithiophosphate of this invention, was subjected to a thermogravimetric analysis to determine degree of weight loss at elevated temperatures. Also subjected to the same test were representative monomeric zinc dialkaryldithiophosphates and monomeric zinc dialkyldithiophosphates.

In the thermogravimetric test, a weighed sample of the test material is heated at constantly increasing temperature and the weight loss at each temperature level is measured. In a typical test, one observes the test material losing weight at a very slow rate until the temperature level is reached at which about 20 percent of the total weight loss of the material has occured. Thereafter, as the temperature is increased, approximately 60 percent more of weight loss occurs over a very small temperature range, usually about 10° to 60° F. At temperatures above this narrow temperature region of rapid weight loss, weight loss again occurs very slowly until the remaining 20 percent of weight loss has occurred. Results of this test are ordinarily reported as the temperature at which 50 percent of the total weight loss is reached. This temperature will lie in the narrow temperature range of rapid weight loss. In the table below, this temperature is designated T(50%). In each test reported in the following table, approximately 20 milligrams of test material were placed in an open dish in a helium atmosphere and heated at a rate of temperature increase of approximately 8° F. per minute.

TABLE

| Compound | Form | T (50%), ° F. |
|---|---|---|
| Zinc dialkyldithiophosphate ($C_4$-$C_6$ alkyl) | Monomer | 380–490 |
| Zinc dialkaryldithiophosphate ($C_{20}$ alkaryl) | do | 720 |
| Polymer B | Polymer | 825 |

It is evident from these data that the polymeric zinc dialkaryldithiophosphate (Polymer B) has approximately twice the thermo-stability of the various monomeric zinc dialkyldithiophosphates which were tested. The polymeric material is also significantly more stable than the monomeric zinc dialkaryldithiophosphate listed.

The significance of these thermo-stability data to the utility of the polymeric dithiophosphates as lubricating oils is clear. The effective temperature limitation on the additives is reflected in the temperature limitation on the whole oil, if the oil is to retain the properties for which the additive is present. Therefore, the higher the temperature at which the additive is stable and effective, the higher the temperature at which the oil may be used satisfactorily in service.

From the above data and disclosure, it is evident that the polymeric metal dialkaryldithiophosphates of this invention are excellent load-carrying additives and extend the operative temperature range of the oil to which they are added.

What is claimed is:

1. The polymeric metal dialkaryldithiophosphate containing at least two of the recurring monomer units

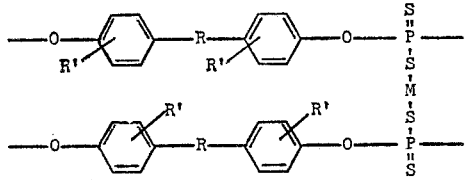

wherein
R is a bivalent alkylene radical of from 1 to 50 carbon atoms;
R' is an alkyl radical of from 1 to 15 carbon atoms, and when
R is a bivalent alkylene radical of from 1 to 3 carbon atoms,
R' is an alkyl radical of from 6 to 15 carbon atoms; and
M is a Group II metal.

2. The polymeric metal dialkaryldithiophosphate claimed in claim 1, wherein M is calcium, barium, or zinc.

3. The polymeric metal dialkaryldithiophosphate claimed in claim 2, wherein M is zinc.

4. The polymeric zinc dialkaryldithiophosphate claimed in claim 3 wherein R is a bivalent alkylene radical of from 5 to 30 carbon atoms.

5. The polymeric zinc dialkaryldithiophosphate claimed in claim 4 wherein R is 10-methylheneicosyl.

References Cited
UNITED STATES PATENTS

| | | | |
|---|---|---|---|
| 2,689,220 | 9/1954 | Mulvany | 252—32.7 |
| 2,945,810 | 7/1960 | Walker | 252—32.7 |
| 3,354,240 | 11/1967 | Pochowicz | 260—930 X |
| 3,520,849 | 7/1970 | Vandenberg | 260—47 P |
| 3,328,360 | 7/1967 | Rozanski et al. | 260—981 X |
| 3,515,712 | 6/1970 | Goldsmith | 260—429.9 X |
| 2,365,938 | 12/1944 | Cook et al. | 260—429.9 X |
| 3,290,347 | 12/1966 | Miller | 260—429.9 |
| 3,471,540 | 10/1969 | Walters | 260—429.9 |
| 2,320,588 | 6/1943 | Graenacher | 260—930 X |

DELBERT E. GANTZ, Primary Examiner

H. M. S. SNEED, Assistant Examiner

U.S. Cl. X.R.

44—69; 252—389, 400; 260—47 P, 429, 431, 930, 981, 987